United States Patent [19]
Tohya

[11] Patent Number: 5,172,308
[45] Date of Patent: Dec. 15, 1992

[54] DC-DC CONVERTER WITH TRANSFORMER HAVING A SINGLE SECONDARY WINDING

[75] Inventor: Hirokazu Tohya, Yamanashi, Japan

[73] Assignee: NEC Corporation, Tokyo, Japan

[21] Appl. No.: 696,774

[22] Filed: May 7, 1991

[30] Foreign Application Priority Data

May 10, 1990 [JP] Japan .................................. 2-120718

[51] Int. Cl.$^5$ ........................................... H02M 3/335
[52] U.S. Cl. ...................................... 363/16; 363/17; 363/48; 363/126
[58] Field of Search ....................... 363/16, 17, 24, 25, 363/26, 47, 48, 126

[56] References Cited

U.S. PATENT DOCUMENTS

| | | | |
|---|---|---|---|
| 4,031,452 | 6/1977 | Longa et al. | 363/17 |
| 4,471,423 | 9/1984 | Hase | 363/126 |
| 4,555,751 | 11/1985 | Koga et al. | 363/126 |
| 4,897,522 | 1/1990 | Bilczo et al. | 363/26 |
| 4,945,462 | 7/1991 | Lieberman | 363/17 |
| 4,977,493 | 12/1990 | Smith | 363/48 |

*Primary Examiner*—Jeffrey Sterrett
*Attorney, Agent, or Firm*—Burns, Doane, Swecker & Mathis

[57] ABSTRACT

In a DC-DC converter, the primary circuit has a bridged switching circuit which applies an input CD voltage to the primary winding of a transformer in response to turn-on pulses to generate alternating current pulses through the primary winding and an antibiasing capacitor. First and second diodes are coupled respectively to opposite ends of the secondary of the transformer to allow energy stored therein to be discharged into a smoothing capacitor through a first smoothing inductor. Third and fourth diodes are coupled respectively to the opposite ends of the secondary winding to allow energy subsequently stored therein to be discharged into the smoothing capacitor through a second smoothing inductor. The arrangement of the diodes are such that the first and third diodes form a circuit that discharges energy from the first smoothing inductor into the smoothing capacitor, and the second and fourth diodes form a circuit that discharges energy from the second smoothing inductor into the smoothing capacitor, and the second and third diodes form a low-impedance circuit across the secondary winding when the switching circuit is turned off to reserve energy in the secondary winding.

6 Claims, 3 Drawing Sheets

DC-DC CONVERTER WITH TRANSFORMER HAVING A SINGLE SECONDARY WINDING

BACKGROUND OF THE INVENTION

The present invention relates to DC-DC converters, and more particularly to a DC-DC converter for low-voltage high-current applications.

FIG. 1 shows a known DC-DC converter which is described in Japanese Patent 62-032702. The primary circuit of the known converter includes a full-bridge switching circuit formed by a first series circuit of transistors Q1 and Q2 and a second series circuit of transistors Q3 and Q4 connected in parallel between a positive input terminal 1 and a negative input terminal 2 across which a noise-suppressing capacitor C1 is coupled. The primary winding 10 of a step-down transformer T1 and an anti-biasing capacitor CT are connected in series across a junction between transistors Q3, Q4 and a junction between transistors Q1, Q2. The transformer has two secondary windings 11, 12. The dotted terminal (or instantaneously positive terminal) of winding 11 is coupled through a diode D1 to one end of a smoothing inductor L1, the undotted (instantaneously negative) terminal of the winding being coupled through a diode D2 to inductor L1. These diodes form a halfwave rectifier. Whereas, for winding 12, the undotted terminal is coupled through a diode D3 to one end of a smoothing inductor L2, the dotted terminal being coupled through a diode D4 to inductor L2. The other ends of inductors L1 and L2 are connected together to a positive output terminal 3 and the undotted terminal of winding 11 and the dotted terminal of winding 12 are connected together to a negative output terminal 4. A smoothing capacitor C0 is connected across output terminals 3 and 4. The bases of transistors Q1~Q4 are coupled to a variable duration pulse generator 13 to which the DC output voltage is applied to control the duration of the turn-on pulses.

Transistors Q1 and Q4 are turned on simultaneously in response to gate-on pulses from pulse generator 13 and then transistors Q2 and Q3 are turned on so that voltage pulses of opposite polarities are successively generated in the primary winding of transformer T1, and voltage pulses of equal magnitude but opposite polarities are induced respectively in the secondary windings 11 and 12. Diodes D1 and D3 are alternately turned on, charging capacitor C0. Diodes D2 and D4 are turned on successively in response to the turn-off of diodes D1 and D3, respectively, to cause energies stored in inductors L1 and L2 to be discharged into capacitor C0 to develop a DC voltage across terminals 3 and 4.

However, the turn-on time of transistors Q1, Q4 may differ from the turn-on time of transistors Q2, Q3 and the core of transformer T1 is magnetically biased in one direction. A DC voltage corresponding to the timing difference develops in the primary winding 10. Capacitor CT provides a feedback circuit for supplying the DC voltage to transistors Q1, Q2 to reduce the effect of the magnetic bias of the transformer core.

Because of the use of two secondary windings, the prior art DC-DC converter is too bulky for applications where large output currents are required. In addition, when all transistors are in an OFF state, diodes D2 and D4 are in a conducting state and two low-impedance loops are formed, one comprising the secondary winding 11 and diodes D1, D2, and the other comprising the secondary winding 12 and diodes D3, D4. It is found that a difference in impedance between these low-impedance loops results in a timing difference between the currents in the secondary windings 11 and 12 and that a current pulse corresponding to this timing difference flows through the primary winding 10 causing the transformer core to be magnetically biased further.

SUMMARY OF THE INVENTION

It is therefore an object of the present invention to provide a small-sized DC-DC converter of low-voltage high-current rating.

Another object of this invention is to provide a DC-DC converter which reduces undesired magnetic biasing of the transformer core.

According to this invention, there is provided a DC-DC converter comprising a transformer having a primary winding and a single secondary winding. A primary circuit includes a bridged switching circuit coupled to a DC voltage source, and an anti-biasing capacitor connected in series with the primary winding to the midpoint of the switching circuit. The switching circuit is periodically turned on and off to generate alternating current pulses through the primary winding and the anti-biasing capacitor. A secondary circuit comprises a smoothing capacitor, and first and second diodes which are coupled respectively to opposite ends of the secondary winding to allow energy stored therein to be discharged into the smoothing capacitor through a first smoothing inductor. Third and fourth diodes are coupled respectively to the opposite ends of the secondary winding to allow energy subsequently stored therein to be discharged into the smoothing capacitor through a second smoothing inductor. The arrangement of the diodes are such that the first and third diodes form a circuit for discharging energy stored in the first smoothing inductor into the smoothing capacitor, and the second and fourth diodes form a circuit for discharging energy stored in the second smoothing inductor into the smoothing capacitor.

BRIEF DESCRIPTION OF THE DRAWINGS

The present invention will be described in further detail with reference to the accompanying drawings, in which.

DETAILED DESCRIPTION

Figure 1:
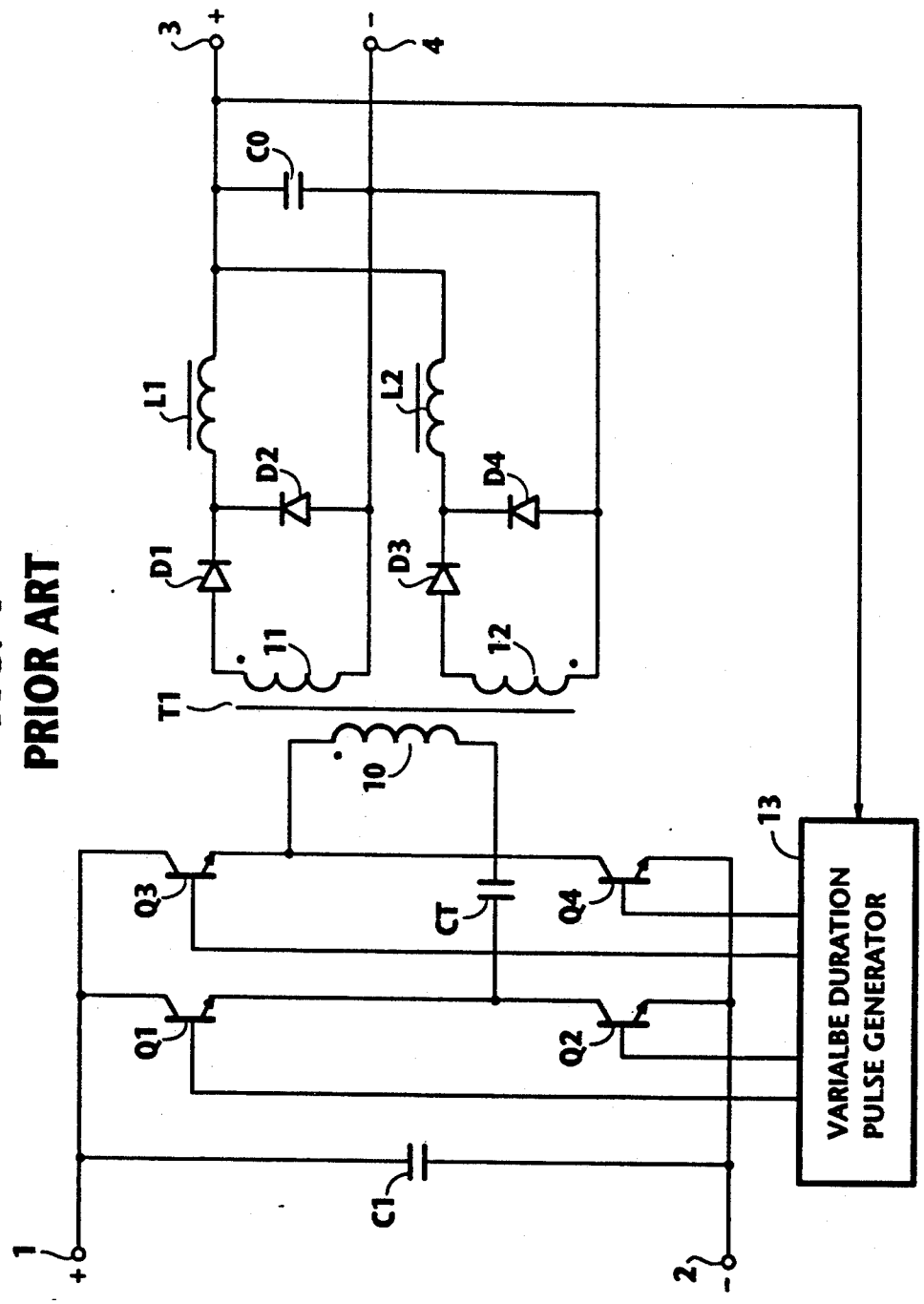
FIG. 1 is a circuit diagram of a prior art full-bridge DC-DC converter.
Figure 2:
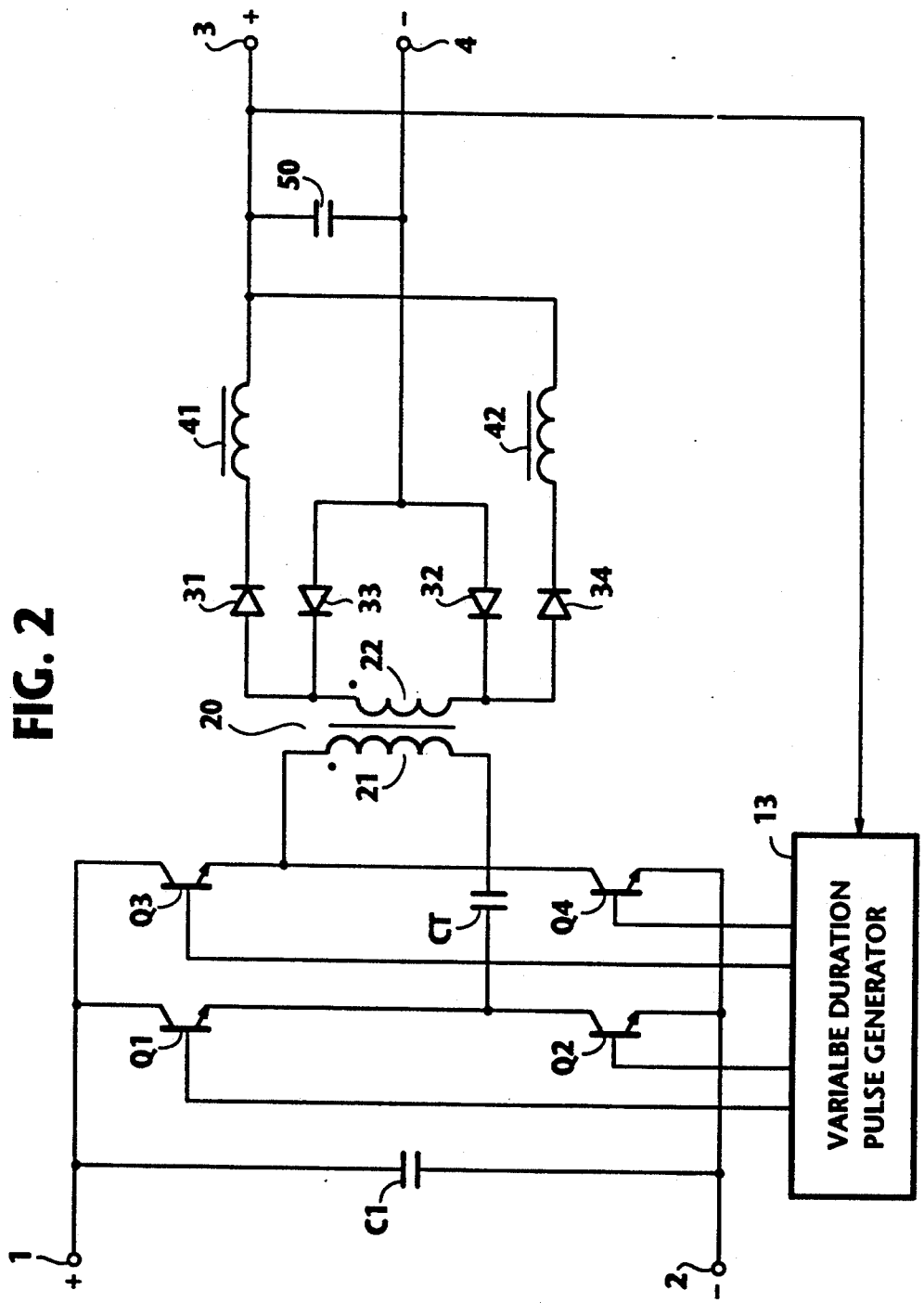
FIG. 2 is a circuit of a full-bridge DC-DC converter according to a first embodiment of the present invention.

Referring now to FIG. 2, there is shown a DC-DC converter according to a first embodiment of the present invention. The primary circuit of the converter is identical to that of the prior art converter. The DC-DC converter of this invention has a transformer 20 having a primary winding 21 coupled to the known full-bridge switching circuit, and a single secondary winding 22.

The dotted terminal of the secondary winding 22 is coupled to the anode of a first diode 31 and the cathode of a third diode 33 and the other terminal of the winding 22 is coupled to the cathode of a second diode 32 and the anode of a fourth diode 34. The cathode of diode 31 is coupled to one end of a smoothing inductor 41 and the cathode of diode 34 is coupled to one end of a smoothing inductor 42, the other ends of inductors 41, 42 being coupled together to the positive output terminal 3. The anodes of diodes 33 and 32 are coupled together to the negative output terminal 4. A smoothing capacitor 50 is connected across output terminals 3, 4.

The first and second diodes 31 and 32, which are coupled respectively to the opposite ends of the secondary winding 22, are made to conduct in response to a first current pulse generated in the secondary winding 22 in a given direction to form a circuit that discharges the energy stored in the winding 22 through the first inductor 41 into capacitor 50. In response to the first current pulse, the second and fourth diodes 32 and 34 form a circuit that discharges energy stored in the second inductor 42 into capacitor 50.

On the other hand, the third and fourth diodes 33 and 34, which are also coupled respectively to the opposite ends of the secondary winding 22, are made to conduct in response to a second, opposite current pulse generated in the secondary winding 22 to form a circuit that discharges the energy stored in the secondary winding 22 through the second inductor 42 into capacitor 50. In response to the second current pulse, the first and third diodes 31 and 33 form a circuit that discharges the energy stored in the first inductor 41 into capacitor 50.

A more detailed description of the operation of the converter of FIG. 2 will be given below.

When switching transistors Q2 and Q3 are turned on, causing a primary current to flow through anti-biasing capacitor CT in one direction, diodes 31 and 32 are turned on to allow a secondary current to flow through inductor 41 to capacitor 50. The energy stored in inductor 42 during the previous switching cycle is, at the same time, discharged through diodes 32 and 34 into capacitor 50.

When switching transistor Q1 and Q4 are turned on, causing a primary current to flow through capacitor CT in the opposite direction, diodes 33 and 34 are turned on to allow a secondary current to flow through inductor 42 into capacitor 50. The energy stored in inductor 41 during the previous switching cycle is, at the same time, discharged through diodes 33 and 31 into capacitor 50.

When all switching transistors are in an OFF state, the energy stored in inductor 41 is discharged through a series circuit of diodes 31 and 33 into capacitor 50 and the energy stored in inductor 42 is discharged through a series circuit of diodes 32 and 34 into capacitor 50. Since diodes 32 and 33 are conducting, the secondary winding 22 is shortcircuited by diodes 32 and 33, allowing energy to be stored into the secondary winding 22.

Since only one low-impedance loop is formed across the secondary winding 22 when all switching transistors are turned off, the average currents through inductors 41 and 42 are equal to each other and hence the average voltage across capacitor CT is zero provided that the turn-on time of transistors Q1 and Q4 is equal to the turn-on time of transistors Q2 and Q3. Thus, the transformer core is prevented from being magnetically biased except for the one caused by the difference in switching times in the primary circuit.

Assume that the turn-on time of transistors Q1 and Q4 becomes longer than the turn-on time of transistors Q2 and Q3, the dotted terminal of the primary winding 21 becomes negative with respect to its undotted terminal and the average current through inductor 41 becomes larger than the average current through inductor 42 by an amount corresponding to the difference between the turn-on times. This causes capacitor CT to develop a positive voltage that cancels the negative voltage at the dotted terminal of the primary winding 21. Conversely, if the turn-on time of transistors Q1 and Q4 becomes shorter than the turn-on time of transistors Q2 and Q3, the dotted terminal of the primary winding 21 becomes positive with respect to the undotted terminal and the average current through inductor 41 becomes smaller than the average current through inductor 42, causing capacitor CT to develop a negative voltage that cancels the positive voltage at the dotted terminal of the primary winding 21.

Figure 3:
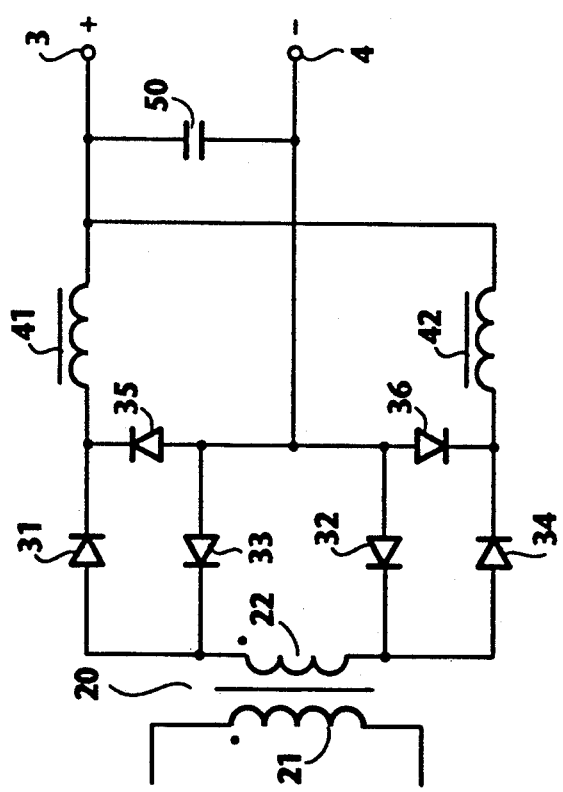
FIG. 3 is a circuit of a full-bridge DC-DC converter according to a second embodiment of the present invention.

A second embodiment of this invention is shown in FIG. 3. This embodiment differs from the previous embodiment in that it further includes diodes 35 and 36. Diode 35 has its anode coupled to the anode of diode 32 and its cathode coupled to the junction between diode 31 and inductor 41 to allow its stored energy to be discharged through diode 35 when transistors Q1 and Q4 are turned off. Diode 36 has its anode coupled to the anode of diode 33 and its cathode coupled to the junction between diode 34 and inductor 42 to allow its stored energy to be discharged through diode 36 when transistors Q2 and Q3 are turned off. Therefore, the provision of diode 35 has the effect of reducing the impedance of the discharging circuit of inductor 41 in comparison with the circuit formed by the series connection of diodes 31 and 33 of FIG. 2, while the provision of diode 36 has the effect of reducing the impedance of the discharging circuit of inductor 42 in comparison with the series connection of diodes 32 and 34 of FIG. 2. Furthermore, when all transistors are turned off, diode 35 forms a second low-impedance circuit with diodes 31 and 32 across the secondary winding 22, and diode 36 forms a third low-impedance circuit with diodes 33 and 34 across the secondary winding 22. Since the second and third low-impedance circuits are in parallel with the first low-impedance circuit formed by diodes 32 and 33, the resultant impedance of the circuits across the secondary winding 22 is low, and hence a greater amount of energy can be stored in the secondary winding during the turn-off period of the converter than that of FIG. 2.

Figure 4:
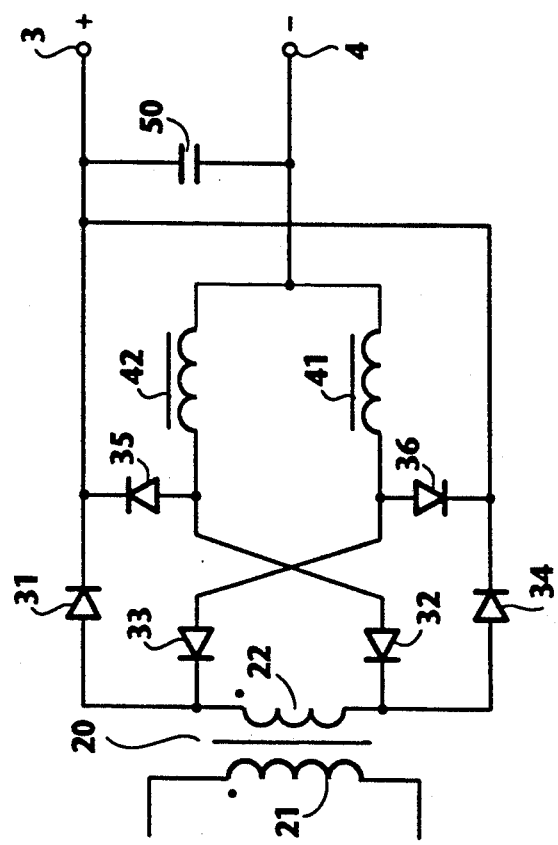
FIG. 4 is a circuit of an alternative form of the second embodiment.

An alternative form of the second embodiment is shown in FIG. 4 in which inductor 42 is connected in a negative power line between the junction of diodes 32 and 35 and the negative output terminal 4, instead of being connected in a positive power line. Likewise, inductor 41 is connected in a negative output line between the junction of diodes 33 and 36 and the terminal 4, instead of being connected in a positive power line.

While mention has been made of full-bridge primary circuits, the secondary circuits of the present invention could equally be as well used in applications in which the primary circuit is of the half-bridge type in which two switching transistors are alternately turned on and off to produce alternating current pulses.

What is claimed is:

1. A DC-DC converter comprising:
 a transformer having a primary winding and a single secondary winding;
 a primary circuit having a series circuit of at least two switching elements coupled to an input DC voltage source, and a first capacitor connected in series with said primary winding to a midpoint of said switching elements, said switching elements being responsive to gating pulses for causing alternating current pulses to flow through said primary winding and said first capacitor; and a secondary circuit comprising a second capacitor, first and second smoothing inductors coupled to said second capacitor, first and second diodes coupled respectively to opposite ends of said secondary winding to allow energy stored therein to be discharged into said second capacitor through said first smoothing inductor, third and fourth diodes coupled respectively to said opposite ends of the secondary winding to allow energy subsequently stored therein to be discharged into said second capacitor through said second smoothing inductor, said first and third diodes forming a first discharging circuit for discharging energy stored in said first smoothing inductor into said second capacitor, said second and fourth diodes forming a second discharging circuit for discharging energy stored in said second smoothing inductor into said second capacitor.

2. A DC-DC converter as claimed in claim 1, wherein said second and third diodes from a low-impedance circuit across said secondary winding when said switching elements are turned off.

3. A DC-DC converter as claimed in claim 1, wherein said second and third diodes are connected in series with said secondary winding and said first and second smoothing inductors.

4. A DC-DC converter as claimed in claim 1, wherein said secondary circuit further comprises a fifth diode coupled between said first and second diodes, and a sixth diode coupled between said third and fourth diodes, said fifth diode forming a circuit for discharging energy stored in said first smoothing inductor into said second capacitor, and said sixth diode forming a circuit for discharging energy stored in said second smoothing inductor into said second capacitor, said second and third diodes forming a first low-impedance circuit across said secondary winding when said switching elements are turned off, said fifth diode forming a second low-impedance circuit with said first and second diodes when said switching elements are turned off, and said sixth diode forming a third low-impedance circuit with said third and fourth diodes when said switching elements are turned off.

5. A DC-DC converter as claimed in claim 1, wherein said secondary circuit further comprises a fifth diode coupled between said first and second diodes, and a sixth diode coupled between said third and fourth diodes, said fifth diode forming a circuit for discharging energy stored in said first smoothing inductor into said second capacitor, and said sixth diode forming a circuit for discharging energy stored in said second smoothing inductor into said second capacitor, said fifth diode forming a first low-impedance circuit with said first and second diodes when said switching elements are turned off, and said sixth diode forming a second low-impedance circuit with said third and fourth diodes when said switching elements are turned off, said second and third diodes being connected in series with said secondary winding and said first and second smoothing inductors.

6. A DC-DC converter as claimed in claim 1, further comprising variable duration pulse generator means for controlling the duration of said gating pulses in accordance with a DC output voltage developed in said second capacitor.

* * * * *